Dec. 13, 1966 S. D. WILTSE 3,291,496
SEALING RING
Original Filed April 16, 1964
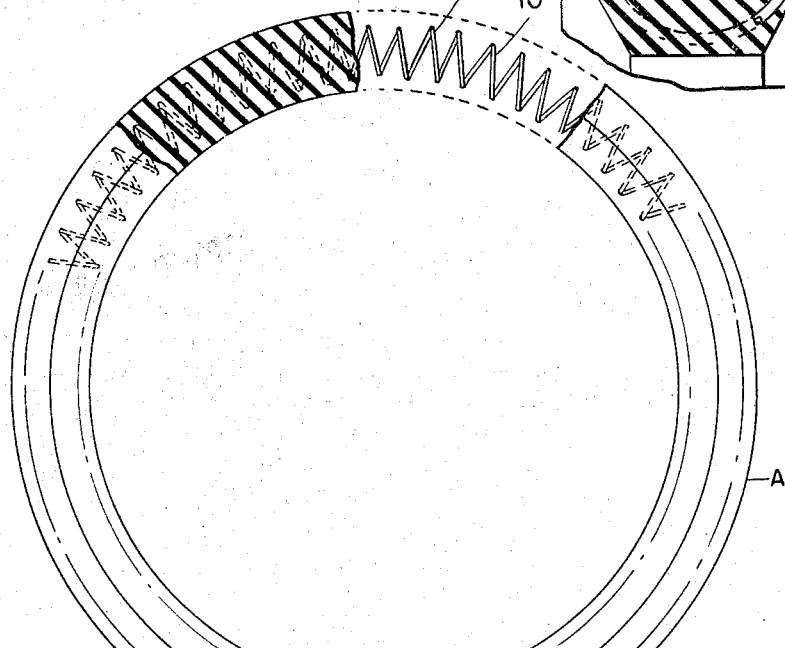
FIG.3.
FIG.4.
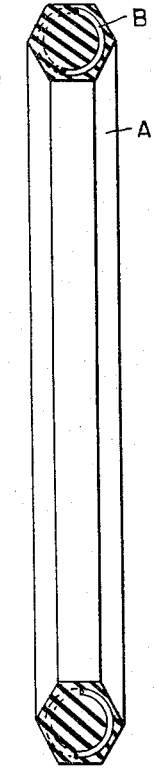
FIG.2.
FIG.1.
INVENTOR.
SUMNER D. WILTSE
BY
Whittemore, Hulbert & Belknap
ATTORNEYS United States Patent Office 3,291,496
Patented Dec. 13, 1966

3,291,496
SEALING RING
Sumner D. Wiltse, Detroit, Mich., assignor to Vibraseal Corporation, Detroit, Mich., a corporation of Michigan
Original application Apr. 16, 1964, Ser. No. 360,244, now Patent No. 3,218,095, dated Nov. 16, 1965. Divided and this application May 4, 1964, Ser. No. 364,402
3 Claims. (Cl. 277—164)

This invention relates generally to an improved sealing ring adapted to form a fluid-type seal between a lateral flange of a length of tubing or pipe and a fitting therefor, and constitutes a division of my application for patent filed April 16, 1964, and bearing Serial No. 360,244, now Patent 3,218,095, dated November 16, 1965.

One of the essential objects of the invention is to provide a composite elastic sealing ring having a uniform hexagonal radial cross section throughout its circumference, whereby four planar surfaces respectively of such ring are adapted to have surface-to-surface sealing engagement with an inclined planar surface of the lateral flange of a length of tubing and with all planar sides respectively of a three-sided annular groove in the fitting.

Another object is to provide a composite elastic radially expansible sealing ring having an annular solid body of rubber or rubber-like material or rubber composition provided throughout its circumference with a unifom hexagonal radial cross section, and an annular tubular reinforcing metallic helix provided throughout its circumference with a uniform circular radial cross section and entirely embedded within said annular body in spaced relation to the planar surfaces thereof.

Another object is to provide a composite elastic sealing ring wherein the annular tubular reinforcing metallic helix is formed from a single spiral wire spring having interconnected convolutions that are substantially circular in cross section and that are also substantially uniform in diameter throughout the circumference of the spring.

Another object is to provide a composite sealing ring that is simple in construction, economical to manufacture and efficient in operation.

Other objects, advantages and novel details of construction of this invention will be made more apparent as this description proceeds, especially when considered in connection with the accompanying drawing wherein:

FIGURE 1 is a vertical longitudinal sectional view through a fully assembled tube coupling with portions of the tubing broken away, and showing a split ring that is employed during the assembly of said tube coupling.

FIGURE 2 is an enlarged vertical sectional view through one of the sealing rings shown in FIGURE 1.

FIGURE 3 is an enlarged fragmentary vertical sectional view through one of the sealing rings.

FIGURE 4 is an elevational view, partly in section, with parts broken away of one of the sealing rings.

Referring now to the drawing, A is an annular solid body, and B is an annular reinforcing helix therefor of a composite sealing ring embodying my invention.

Preferably the annular solid body A is formed of elastic or stretchable material such as rubber or rubber-like material or rubber composition and has a uniform hexagonal radial cross section throughout its circumference, whereby it has only six planar surfaces. The annular reinforcing helix B has a circular radial cross section and is concentric with and is entirely embedded within said annular body A in spaced relation to the six planar surfaces thereof. Preferably the helix B is formed from elastic or stretchable resilient material such as a single spiral wire spring having throughout the circumference of the body A interconnected stretchable helical convolutions 10 that are substantially circular in cross section and that are also substantially uniform in diameter throughout the circumference of the body A.

In the present instance, two composite rings 11 and 12 respectively of similar construction are employed between a fitting 13 and two lengths 14 and 15 respectively of tubing or pipes to provide fluid-tight seals therebetween. However, it is apparent that one or more composite rings may be employed wherever desired and in couplings or connections of various types.

As shown, the fitting 13 is a tubular member of any suitable material having a circular outer surface 16 and having interiorly thereof at a point substantially midway between opposite ends thereof an annular planar portion 17. Located at opposite sides of the annular portion are annular three-sided inwardly opening grooves or channels 18 and 19 respectively, while located at the outer sides of the grooves 18 and 19 are annular planar portions 20 and 21 respectively that are substantially in alignment with the planar annular portion 17.

The two lengths 14 and 15 respectively of tubing are substantially aligned with each other and may be of any suitable material. Such lengths 14 and 15 of tubing are of equal diameter and extend axially of the fitting 13. Preferably such lengths 14 and 15 of tubing have at their adjacent vertical ends 22 and 23 respectively outwardly projecting lateral flanges 24 and 25 respectively located within the annular planar portion 17 of the fitting and provided with vertical faces 26 and 27 respectively that are flush with the vertical ends 22 and 23 respectively of said tubing and that are disposed in face-to-face relation with each other.

The flanges 24 and 25 are provided upon their outer sides with upwardly and inwardly inclined planar surfaces 28 and 29 respectively that are opposed to and that are substantially parallel with the outermost planar sides 30 and 31 respectively of the three planar sides of said grooves 18 and 19.

The two composite sealing rings 11 and 12 respectively cooperate with the flanges 24 and 25 respectively of the two lengths 14 and 15 respectively of tubing and with the fitting 13 to retain the flanged ends of said tubes within the annular planar portion 17 of the fitting and to provide fluid-tight seals therebetween. In this connection, the inside diameter of each of the rings 11 and 12 is less than the diameter of each of the flanges 24 and 25 respectively of the tubing, however, such rings are expansible radially and are capable of being stretched over the flanges 24 and 25 of the lengths 14 and 15 of tubing before such lengths are assembled with the fitting.

To facilitate the assembly of the parts, the fitting 13 has at the outer sides of the annular planar portions 20 and 21 beveled or tapered edges 32 and 33 to not only permit the flanges 24 and 25 of the lengths 14 and 15 of tubing to be inserted into the fitting, but also to permit a short length of a longitudinally split ring 34 to be inserted within the fitting. Such split ring 34 is preferably provided at its outer end with a laterally projecting flange 35 that serves as a finger piece by which the split ring may be conveniently manipulated. Moreover, the spaces respectively between the exterior surfaces of the lengths 14 and 15 respectively of tubing and the annular planar portions 20 and 21 of the fitting are in each instance slightly greater than the cross sectional dimensions between opposed planar surfaces of each polygonal ring, whereby such rings 11 and 12 may be moved between the outer surfaces of the tubes 14 and 15 and the annular planar portions 20 and 21 respectively of the fitting into the annular three-sided inwardly opening grooves 18 and 19 respectively in the fitting to retain the flanges 24 and 25 at the adjacent ends of the lengths 14 and 15 of tubing within the annular portion 17 of the fitting and to provide fluid-tight seals therebetween.

When the parts are assembled, then four planar surfaces respectively of each of the annular polygonal bodies A of said rings 11 and 12 respectively have surface-to-surface sealing engagement with the inclined planar surfaces 28 and 29 respectively of the lateral flanges 24 and 25 respectively of the lengths 14 and 15 respectively of tubing and with the three planar sides of the annular grooves 18 and 19 respectively in the fitting.

When assembled as described, the sealing rings 11 and 12 will be under compression between the fitting 13 and the flanges 24 and 25 respectively of the tubing, and will effectively retain the flanges 24 and 25 of the tubing in coupled relation with the fitting and will effectively provide fluid-tight seals between such flanges and the fitting.

To facilitate disassembly of the parts, a suitable hook (not shown) may be engaged with the rings 11 and 12 to remove the same from the fitting 13, or cap screws or bolts (not shown) can be threaded vertically downwardly through the fitting 13 directly above the rings 11 and 12 and can be adjusted to remove the latter from the fitting.

What I claim as my invention is:

1. A composite sealing ring comprising an annular solid body of uniform hexagonal radial cross section throughout its circumference providing only six exterior planar surfaces, said annular solid body having a longitudinally extending circular center line, adjacent circumferentially extending edges of said planar surfaces meeting each other whereby the six planar surfaces are symmetrically arranged about the longitudinally extending circular center line of said annular solid body and form the complete exterior surface of said annular solid body, and an annular reinforcing helix entirely embedded within said annular solid body, said annular reinforcing helix being provided throughout its circumference with a uniform circular radial cross section smaller than the uniform hexagonal radial cross section of said annular solid body and being concentric with the circular center line of said annular solid body, said reinforcing helix having circumferentially spaced interconnected helical convolutions of uniform diameter extending substantially radially of said annular solid body and entirely disposed in spaced relation to the six planar surfaces thereof.

2. The composite sealing ring defined in claim 1, wherein both said annular solid body and said annular reinforcing helix are formed from stretchable material and are radially expansible.

3. The composite sealing ring defined in claim 1, wherein said annular solid body is formed of rubber-like material, and said annular reinforcing helix is a single spiral wire spring having interconnected convolutions of circular cross section and of uniforrm diameter throughout the circumference of said annular solid body.

References Cited by the Examiner

UNITED STATES PATENTS

| | | | |
|---|---|---|---|
| 2,444,119 | 6/1948 | Thorn et al. | 277—177 |
| 2,953,399 | 9/1960 | Weaver et al. | |
| 3,051,500 | 8/1962 | Wiltse | 277—235 X |
| 3,218,095 | 11/1965 | Wiltse | 285—318 |

SAMUEL ROTHBERG, *Primary Examiner.*